United States Patent Office 3,522,221
Patented July 28, 1970

3,522,221
THREE-COMPONENT POLYTHIOETHERS
Irwin J. Gardiner, Fanwood, and Daniel N. Hall, Linden, N.J., assignors to Esso Research and Engineering Company, a corporation of Delaware
No Drawing. Filed Apr. 24, 1967, Ser. No. 632,950
Int. Cl. C07c *154/02;* C07d *7/04;* C08f *15/00*
U.S. Cl. 260—79.7                                7 Claims

ABSTRACT OF THE DISCLOSURE

Readily crosslinkable three-component polythioether compositions are formed by the polyaddition of a dithiol with an organic diunsaturate such as an alkyl acetylene in admixture with another diunsaturate containing a masked or potential thiol group. Examples of the latter include acetylenic and allenic thiol esters, S-acetylenic xanthates, 2-(tetrahydropyranyl) acetylenyl sulfides, and acetylenyl isothiouronium hydrohalides.

The present invention relates to new liquid polythioether addition products, a process for their formation, and to crosslinked mastic compositions formed from said products. More particularly, it relates to three component polythioether compositions containing pendant protected or masked crosslinking sites and to vulcanizates formed from said products.

BACKGROUND OF THE INVENTION

Polythioethers formed by the free radical addition of a dithiolic compound to a diunsaturated organic compound having number average molecular weights varying from 300 to about 7000 have many potential applications especially as the base constituent of mastic compositions. Cured or crosslinked polythioethers have many attractive properties and in particular are highly resistant to ozone and oxygen degradation, are relatively immune to attack by organic solvents, and exhibit very good low temperature properties.

Conventionally, bifunctional polythioether addition products are crosslinked through either their olefinic or sulfhydryl terminal functionality with the use of relatively expensive and sometimes highly toxic reagents. The use of such curatives is not entirely satisfactory in commercial practice because the reagents in addition to being economically unattractive and sometimes dangerous to handle because of their toxicity also require a rather narrow selection of time and temperature conditions at which the curing operation is conducted.

It is, therefore, an object of this invention to provide a new class of polythioether products which contain as the principal constituents a dithiol and a diunsaturate and varying amounts of diunsaturates containing masked or potential thiol functionality. Such products can be readily crosslinked with conventional rubber curing systems whose use and handling characteristics are well known to the trade.

It is a further object of this invention to provide a method for the formation of three-component polythioethers having effectively masked or potential crosslinking sites that are highly stable during prolonged storage but may be made to undergo crosslinking when desired. Other objects will appear hereinafter.

SUMMARY OF THE INVENTION

Now, in accordance with the present invention, it has been found that highly attractive polythioethers possessing masked or potential pendant crosslinking sites that can be readily cured or crosslinked with conventional metal oxide curing systems can be prepared by the free radical addition of a monomer mixture made up of a dithiol compound (including $H_2S$) and a diunsaturated organic compound with a minor amount of either an allenic or acetylenic thiol ester, an S-acetylenic xanthate, a 2-(tetrahydropyranyl) acetylenyl sulfide, or an acetylenyl isothiouronium hydrohalide third monomer. Depending upon the constituents of the monomer mixture and the reaction conditions employed, the polymer compositions are liquids or low melting solids that exhibit number average molecular weights varying from about 1000 to 6000.

The dithiolic and diunsaturated components of the monomer mixture are the principal building blocks of the polythioether compositions and the third monomer preferably makes up only a minor part of the total polythioether backbone. The monomer mixture to which a third monomer is added to introduce masked crosslinking sites into the resulting polythioether composition is made up of either (a) hydrogen sulfide (the simplest dithiol) and an acetylenic compound; (b) an organic dithiol and an acetylenic compound; (c) an organic dithiol and an allenic compound; (d) an organic dithiol and a diallylic sulfide; or (e) hydrogen sulfide and a diallylic sulfide.

The dithiol compound which is used in the formation of the present polythioethers may be either $H_2S$ or an organic compound having the general formula:

$$HSRSH$$

wherein R is a divalent organic radical particularly divalent hydrocarbon radicals and divalent radicals containing either sulfur, oxygen or silicon in addition to hydrogen and carbon atoms. Preferably, R is (1) a $C_2$ to $C_{30}$ divalent alkylene radical, e.g. dimethylene, hexamethylene, etc.; (2) a $C_8$ to $C_{30}$ bis-alkylene substituted aromatic radical, e.g. p-xylylene, p-bis-ethylene-benzene, etc.; (3) a $C_6$ to $C_{30}$ divalent aromatic radical such as m-phenylene, 1,5-naphthylene, etc.; and (4) a $C_2$ to $C_{30}$ divalent organic radical containing either sulfur, oxygen, or silicon in addition to carbon and hydrogen atoms such as thio-bis-ethylene, oxy-bis-ethylene, thio-bis-trimethylene, thio-bis-ethylthioethylene, etc.

Particularly preferred thiols are those compounds wherein R is a $C_2$ to $C_4$ alkylene radical since such materials are especially reactive and yield polymers of outstanding resistance to auto-oxidation and hydrocarbon solvents.

The acetylenic compounds which may be used in conjunction with either a dithiol or hydrogen sulfide in a monomer mixture have the general formula:

$$CH \equiv CR'$$

wherein R' is a hydrogen atom or a $C_1$ or $C_{30}$ hydrocarbon radical. Preferably, R' is a (1) hydrogen radical; (2) a $C_1$ to $C_{30}$ alkyl radical, e.g. methyl, ethyl, pentyl, dodecyl, etc.; or (3) a $C_7$ to $C_{20}$ aralkyl radical such as benzyl, phenylethyl, naphthyl methyl, etc.

Although any of the above-named materials are suitable for the formation of relatively high molecular weight polythioethers, it is especially preferred that R' be a $C_{10}$ group or lower, especially a $C_1$ and $C_4$ alkyl group. Mono-substituted acetylenic compounds are preferred for use in the instant invention; however, acetylenic compounds having the general formula:

$$R'C \equiv CR'$$

can also be used either alone or in combination with mono-substituted acetylenic compounds.

The diallyic sulfide compounds which may be used in combination with either a dithiol or hydrogen sulfide in the formation of polythioethers have the general formula:

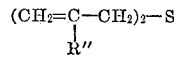

wherein R" is a hydrogen atom or methyl radical.

The allenic compounds that may be used in conjunction with an organic dithiol in the monomer mixture has the general formula:

$$CH_2=C=CR'''_2$$

wherein both R''' functions may be hydrogen atoms, monovalent hydrocarbon radicals having from 1 to 20 carbon atoms, or one R''' function being a hydrogen atom and the other being a monovalent hydrocarbon radical having from 1 to 20 carbon atoms. Preferably, R''' is a (1) hydrogen radical, (2) a $C_1$ to $C_{10}$ alkyl radical, e.g. methyl, ethyl, hexyl, decyl, etc., or (3) a $C_7$ to $C_{20}$ aralkyl radical such as benzyl, phenylethyl, naphthyl methyl, etc.

The aforementioned acetylenic compounds, diallyl sulfides and allenic compounds will be referred to in the specification and claims as "first diunsaturate."

As stated previously, minor amounts of a third monomer are introduced with the two constituents of any particular monomer mixture in order to secure polythioether products having masked or potential crosslinking sites. From 1 to 100 mole percent, preferably from 1 to 10 mole percent, of the third monomer, based upon the amount of diunsaturated compound present in the monomer mixture, is introduced to the polymerization zone. The third monomer is incorporated in the final polythioether compositions in approximately the same ratio as the ratio that the third monomer bears to the constituents of the monomer mixture prior to the addition reaction.

Useful third monomers that impart masked or potential crosslinking functionality to the polythioether materials include: (a) acetylenic thiol esters having the general formula:

$$HC\equiv C-(CA_2)_n-S\overset{O}{\overset{\|}{C}}L$$

wherein A is preferably a hydrogen atom or an alkyl radical having from 1 to 3 carbon atoms; L is a hydrogen atom, an alkyl radical having from 1 to 6 carbon atoms, or an aryl radical having from 6 to 12 carbon atoms, and $n$ varies from 0 to 10; (b) an allenic thiol ester having the general formula:

$$H_2C=C=CD-S\overset{O}{\overset{\|}{C}}E$$

wherein D is a hydrogen atom or an alkyl radical having from 1 to 3 carbon atoms, and E is a hydrogen atom, an alkyl radical having from 1 to 6 carbon atoms or an aryl radical having from 6 to 12 carbon atoms; (c) an S-acetylenic xanthate having the general formula:

$$HC\equiv C(CA_2)_nS\overset{S}{\overset{\|}{C}}OM$$

wherein A is preferably a hydrogen atom or an alkyl radical having from 1 to 3 carbon atoms, M is an alkyl radical having 1 to 6, preferably 1 to 3, carbon atoms, and $n$ varies from 0 to 10; (d) a 2-(tetrahydropyranyl) acetylenyl sulfide having the general formula

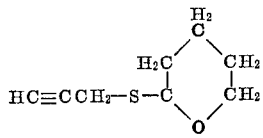

and (e) an acetylenyl isothiouronium hydrohalides having the general formula:

$$HC\equiv C(CK_2)_nS-\overset{NG}{\overset{\|}{C}}NJ_2 \cdot HX$$

wherein K is a hydrogen atom or an alkyl radical having from 1 to 3 carbon atoms, $n$ varies from 0 to 10, G and J are hydrogen or alkyl radicals having from 1 to 3 carbon atoms, preferably 1 to 3 carbon atoms, and X is a halogen atom, preferably a chlorine or bromine atom.

The aforementioned third monomers will be referred to in the specification and claims as "second diunsaturate."

Representative non-limiting examples of useful second diunsaturate monomers include: propargyl thiol acetate, propargyl thiol benzoate, 3-butynyl thiol acetate, propargyl thiol butyrate, propargyl thiol-2,4-nitrobenzoate, S-propargyl ethyl xanthate, S-(3-butynyl) ethyl xanthate, S-propargyl methyl xanthate, S-propargyl phenyl xanthate, S-propargyl acetyl xanthate, propargyl isothiouronium hydrobromide, propargyl isothiouronium hydrochloride, 3-butynyl isothiouronium hydrobromide, propargyl-N-phenyl isothiouronium hydrobromide, and propargyl trimethyl isothiouronium hydrochloride.

The molar ratio of dithol to total unsaturate (first diunsaturate plus second diunsaturate compound of the monomer system) present in the reaction zone can vary from about 1.2:1 to 0.9:1. Typically, the total reactants is made up of 45 to 49 mole percent diunsaturate, 1 to 5 mole percent third monomer, and about 50 mole percent dithiol.

The addition reactions for the production of the polythioether products can be carried out in bulk or in the presence of inert diluents. The polythioether products having masked or potential crosslinking sites can be prepared most efficiently using bulk polymerization techniques, that is, carrying out the addition reaction in the absence of solvents. When higher molecular weight polythioether materials are desired, the addition reaction is preferably carried out in the presence of an inert solvent.

Useful inert solvents include saturated aliphatic hydrocarbons, such as pentane, cycloheptane, etc., halogenated saturated aliphatic hydrocarbons, aliphatic ethers, and aliphatic thioethers such as dimethyl sulfide, tetrahydrothiophene, etc.

The conditions at which the addition reaction is conducted may vary over a wide range. For bulk addition reactions, temperatures varying from —80 to 100, preferably 0 to 50° C. can be used. When the preferred compositions are formed in the presence of a solvent, temperatures varying from —90 to 100, preferably 0 to 50° C. are most suitably used. The addtion reactions contemplated by this invention are not critically sensitive to pressure. In general, pressures ranging from 0.1 to 20 atmospheres, preferably from 0.2 to 5 atmospheres, can conveniently be used.

The reaction time used in the formation of the polythioether products is not critical; however, sufficient time should be allowed for the desired monomer conversion which depends upon temperature, reactant concentration, activity of chemical catalyst used, intensity of radiation or U.V. source employed, etc. High yields of the polythioether products are secured within the temperature and pressure limits set forth above within from 1 to 300 hours.

While not absolutely essential to the formation of the polythioether products having masked or potential crosslinking sites, it is desirable to employ a free radical initiator in the reaction. Radiation such as ultraviolet light, gamma radiation or heat may be applied to the reactants to promote the addition reactions. Additionally, chemical initiators such as peroxides, azo compounds, etc., may be used instead of radiation or in combination with it. Ultraviolet light such as that obtained from a high pressure, wide arc mercury lamp or gamma radiation ($Co_{60}$ source) are the preferred reaction initiators although peroxidic initiators such as azobisisobutyrlnitrile, bis-t-butyl peroxide, etc., can be used also. The chemical initiators are employed from 0.1 to 10, preferably 0.2 to 5 wt. percent, based on total reactants.

The reaction vessel utilized for the addition reactions may be formed from any material that is inert to the reactants and the catalyst used and which is capable of withstanding the pressures encountered within the reaction zone. Reaction vessels formed from stainless steel, glass-lined steel or quartz are satisfactory.

The polythioether addition products contain a plurality of monosulfide (—C—S—C—) linkages as the polymer molecules are composed of regularly alternating dithiol units and the saturated residues of the diunsaturated units. Randomly dispersed in the polymer molecule are the saturated residues of the third monomer. The diunsaturated portion of the third monomer is incorporated directly into the polymer chain in the place of one or more of the normally recurring diunsaturated molecules leaving the remaining portion of the molecule that contains the masked crosslinking site located pendant to the main polymer chain.

The polythioether products contain terminal thiol (—SH) functionality when the molar ratio of dithiol to total diunsaturate in the reaction zone is equal to or greater than 1:1. When the molar ratio of dithiol to total diunsaturate is less than 1:1, the addition products ordinarily contain one terminal thiol function and one olefinic terminal function or two terminal olefinic functions.

Typically, the polymer products of this invention exhibit the following generalized structure:

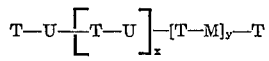

wherein T represents dithiol units, U represents the saturated residues of the first diunsaturated component of the monomer system, M is the saturated residue of the second diunsaturated that is incorporated into the polymer backbone and a pendant masked crosslinking function that can be readily converted to a thiol function, $x$ varies from about 5 to 50, preferably 10 to 25, and $y$ ranges from 1 to 10. Each polythioether molecule contains at least two terminally and/or pendantly located thiol or masked thiol functions that can be converted to thiol functions prior to or during curing operations.

The polymeric addition products of this invention have many uses as intermediates as the polymers possess reactive sulfhydryl or olefinic terminal functionality. However, the materials find particular utility as the base substituent for mastic compositions. The addition products containing masked or potential crosslinking sites are readily cured to stable rubbery three dimensional networks by converting the pendant thiol ester, isothiouronium, or xanthate groups in situ to thiol groups with a base followed by crosslinking of the thiol groups through oxidation. Crosslinking of the polythioether products is achieved by mixing the polymeric compositions with minor amounts of the curing agents and heating the total mixture at temperatures varying from 0 to 150° C., preferably 20 to 95° C., for a period varying from 1 minute to 48 hours. Generally, acceptable cures can be obtained in from 5 minutes to 24 hours at room temperature.

The preferred curing system is a mixture of an oxide of a metal of Groups II–B, IV–B, IV–A and VII–B of the Periodic Table (Mack et al., Textbook of Chemistry, Ginn and Company, 2nd Edition (1956), page 313) in conjunction with either an organic amine or an inorganic base. Useful metal oxides include lead oxide, zinc oxide, $TiO_2$, $MnO_2$, etc. Suitable amine compounds are tertiary amines such as triethyl amine, cyclic diamines such as triethylene diamine, dialkyl anilines such as dimethyl aniline, and aralkyl polyamines such as tris-2,4,6-(dimethyl aminomethyl)-phenol. Generally, from 1 to 50, preferably 10 to 30, parts by weight of metal oxide and from 1 to 20, preferably 1 to 10, parts by weight of amine is used per 100 parts by weight of the polythioether composition.

Prior to curing, the polymeric addition products having pendant masked crosslinking sites may be compounded with stabilizers, plasticizers or extender oils. Additionally, the polythioether products may be loaded with up to about 10 parts, preferably up to 200 parts, per 100 parts of polymer, of well-known fillers such as carbon black, petroleum coke or the usual mineral fillers. Among the carbon blacks that may be compounded with the polymeric addition products are the channel blacks, furnace blacks and thermal blacks. Mineral fillers which may be used include noncarbon black fillers or pigments such as the oxides, hydroxides, sulfides and carbonates of silicon, aluminum, magnesium, zinc or the like, as well as the silicates and aluminates of the above elements.

The cured polythioether compositions of this invention are highly resistant to oxygen and ozone degradation over a broad range of temperatures and additionally are relatively immune to organic solvent attack. Hence, the cured materials find particular utility in automotive applications.

DESCRIPTION OF THE PREFERRED EMBODIMENTS

The invention will be further understood with reference to the following examples:

Example 1.—Preparation of propargyl thiolacetate

A solution of 98 grams (1.0 mole) of sodium thiolacetate in 200 milliliters of methanol was introduced into a 4-neck flask equipped with a condenser, magnetic stirrer, dropping funnel and nitrogen inlet. The sodium thiolacetate was prepared by reacting 76 grams (1.0 mole) of thiolacetic acid and 54 grams (1.0 mole) of sodium methoxide. To the sodium thiolacetate solution was slowly added 74.5 grams (1.0 mole) of propargyl chloride. The resulting reaction was exothermic. The reaction flask and its contents were maintained at a temperature below about 40° C. by positioning the flask in an ice bath. Following reaction the total mixture was stored for 17 hours at about 24° C. Thereafter the solution was extracted twice with 150 milliliter portions of ether. The combined organic extracts were then washed twice with water, dried over sodium sulfate and stripped of solvent in a 65° C. bath at 80 millimeters of mercury pressure to obtain 94.9 grams (83% yield) of crude product.

This crude product was combined with 22.7 grams of product obtained from a previous run and the total mixture distilled to yield 87 grams of pale yellow propargyl thiolacetate. The product exhibited a boiling point between about 63 and 65° C. at 19 millimeters of mercury pressure. The product was analyzed for carbon, hydrogen and sulfur content and the product was found to contain 53.10 wt. percent carbon, 5.50 wt. percent hydrogen and 27.86 wt. percent sulfur. Propargyl thiolacetate which has an empirical formula of $C_5H_6OS$ and contains 52.6 wt. percent carbon, 5.3 wt. percent hydrogen and 28.09 wt. percent sulfur. A nuclear magnetic resonance spectrum of the product in carbon tetrachloride consisted of chemical shift signals at 3.60 p.p.m. (doublet, $J=3$ cycles per second) for —$CH_2$—, 2.35 p.p.m. (singlet) for $CH_3$—, and 2.20 p.p.m. (multiplet) for HC≡.

Example 2.—Preparation of ethyl propargyl xanthate

A solution of about 1 mole of sodium ethyl xanthate in about 200 milliliters of methanol was introduced to a 4-neck flask equipped with a condenser, magnetic stirrer, dropping funnel and nitrogen inlet. The sodium ethyl xanthate was formed by the equimolar reaction of sodium hydroxide, carbon disulfide and ethyl alcohol. To the sodium ethyl xanthate-methanol solution was slowly added 75.4 grams (1.0 mole) of propargyl chloride. Because of the exothermic nature of the reaction, the reaction flask was maintained within an ice bath in order to keep the reactants and solvents at the desired temperature levels. Upon completion of the reaction, the solution was extracted twice with 100 ml. portions of ether. The combined organic extracts were washed twice with water, dried over sodium sulfate and stripped of solvent to recover a 57% yield of product. After purification the product exhibited a boiling point varying from 52 to 53.5° C. at 0.4 millimeter of mercury pressure.

A carbon, hydrogen, sulfur analysis of the product indicated that the product contained 44.89 wt. percent carbon, 4.96 wt. percent hydrogen and 4.29 wt. percent sulfur. Ethyl propargyl xanthate, which has an empirical formula of $C_6H_8OS_2$, should contain 44.9 wt. percent carbon, 5.03 wt. percent of hydrogen and 4.02 wt. percent sulfur. The nuclear magnetic resonance spectrum of the product in carbon tetrachloride consisted of chemical shift signals at 4.64 p.p.m. (quartet, $J=7$ cycles per second) for $CH_2O$, 4.18 p.p.m. (singlet, approximately 5% impurity), 3.82 p.p.m. (doublet, $J=2.5$ cycles per second) for $CH_2C=$, 3.43 (singlet, approximately 5% impurity), 2.20 p.p.m. (triplet, $J=2.5$ cycles per second for $HC=$, and 1.41 p.p.m. (triplet, $J=7$ cycles per second) for $CH_3CH_2$.

was carefully opened and any unreacted methylacetylene or allene vented. The final product was obtained by stripping the polymerization residues with nitrogen bubbling for from 3 to 4 hours at 100° C. at 0.25 millimeter of mercury pressure.

The results of the polymerization tests and the conditions at which the polymerization tests were conducted are set forth in Table I below:

TABLE I

| Starting Materials | | | | | Hours, u.v. | Polymer yield, percent | Polymer [2], Mn | Elemental Composition | | | | Degree of incorporation of termonomer [3] | Degree of polymerization |
|---|---|---|---|---|---|---|---|---|---|---|---|---|---|
| Diunsaturate | | $HS(CH_2)_3SH$ | Termonomer | | | | | C | H | S | O | | |
| Type | Moles | Moles | Type [1] | Moles | | | | | | | | | |
| Example: | | | | | | | | | | | | | |
| 4 | $CH_3C\equiv CH$ | [4] 1.0 | 1.0 | | | 2 | 95 | 2,117 | 48.36 | 8.09 | 43.97 | | | 14.3 |
| 5 | $CH_3C\equiv CH$ | 1.00 | 1.0 | PA | 0.05 | 11 | 94 | 2,586 | 47.58 | 8.06 | 44.06 | 0.50 | 4.7 | 17.1 |
| 6 | $CH_3C\equiv CH$ | 1.02 | 1.0 | PA | 0.025 | 11 | 94 | 2,330 | 47.92 | 8.23 | 44.19 | 0.32 | 3.0 | 15.5 |
| 7 | $CH_3C\equiv CH$ | 1.04 | 1.0 | PA | 0.01 | 11 | 95 | 2,407 | 47.61 | 8.23 | 44.11 | <0.22 | | |
| 8 | $CH_2C\equiv CH$ | [4] 0.95 | 1.0 | PA | 0.05 | 19 | 94 | 1,836 | 47.70 | 7.93 | 43.90 | 0.6 | 5.7 | 12.1 |
| 9 | $CH_3C\equiv CH$ | [4] 0.98 | 1.0 | PX | 0.05 | 19 | 93 | 1,388 | 46.96 | 8.05 | 44.71 | 0.26 | | |
| 10 | $CH_2=C=CH_2$ | 0.4 | 0.5 | PA | 0.1 | 8 | 89 | 1,164 | 46.23 | 7.58 | 44.91 | 1.86 | 18.8 | 7.2 |

[1] PA=Propargyl Thiolacetate; PX=Ethyl Propargyl Xanthate.
[2] Measured by vapor pressure osmometry in benzene.
[3] Calculated from oxygen content of polymer.
[4] Purified methylacetylene used.

Example 3.—Preparation of propargyl isothiouronium hydrobromide

To a suspension of 15.2 grams (0.2 mole) of thiourea and 100 cc. of acetone maintained at 20° C. was added slowly 24 grams (0.2 mole) of propargyl bromide. The reaction mixture was stirred for 20 minutes, during which time the thiourea completely dissolved. Diethylether was then added to the acetone solution until it became cloudy. The total mixture was then stored overnight at −15° C. A white solid was formed and was collected and redissolved in acetone containing a small amount of methanol. This white crystalline material had a melting point of between 117 and 119° C. Its identity as propargyl isothiouronium hydrobromide was confirmed from a 60-megacycle nuclear magnetic resonance spectrum in deuterium oxide which consisted of chemical shift signals at 4.65 p.p.m. (broad singlet), 4.21 p.p.m. (doublet, $J=3$ cycles per second) and 3.21 p.p.m. (multiplet) downfield from a tetramethyl silane reference with intensities in the ratio of 3:2:1.

Examples 4–10

To demonstrate the formation of the 3-component polythioethers of this invention, a series of polymerization experiments were conducted wherein a monomer mixture made up of either trimethylene dithiol and methylacetylene or trimethylene dithiol and allene were polymerized with either propargyl thiolacetate or ethyl propargyl xanthate. Additionally, a control experiment was conducted in which no third monomer was added to the polymerization monomers.

In each test a mixture of trimethylene dithiol and the desired termonomer was placed in a quartz pressure tube (typically 500 x 32 mm.) that was equipped with an internal Teflon clad magnetic stirrer and a screw-seal. After reagent addition the tube was cooled to −60° C., evacuated and an amount of either methylacetylene or allene was condensed in the tube. The reaction tube was then sealed, warmed to 24° C. and weighed. Thereafter the tube was shaken by hand to insure mixture homogeneity and the tube placed in a water bath maintained at about 19° C. at a point about 5 centimeters from a medium-pressure mercury lamp. The tube contents were irradiated with the light of the lamp for the desired period. The tube was removed from the bath every 15 minutes and shaken well by hand to disperse the thick material which formed near the wall of the tube. For polymerization runs in excess of 6 hours, the radiation was sometimes suspended overnight and commenced on the following day. Upon completion of the entire reaction period, the tube The data set forth in Table I above illustrate that polythioether products having masked or potential crosslinking sites can be readily formed, by a free radical addition process. The three component polythioethers formed exhibited number average molecular weights varying from about 1200 to about 2600.

Example 11.—Polymerization of methylacetylene, 1,3-propanedithiol and propargyl isothiouronium hydrobromide A mixture of 3.9 grams (0.02 mole) of propargyl isothiouronium hydrobromide, 13 ml. of methanol and 55.1 grams (0.51 mole) of 1,3-propanedithiol was placed in a quartz tube and the mixture degassed by evacuating the tube. The tube was then sealed and placed in a water bath maintained at about 19° C. approximately 5 centimeters from a medium-range mercury lamp. The reaction mixture was stirred constantly and irradiated for 1 hour. The tube was then withdrawn from the bath, cooled to −70° C. and evacuated. Methylacetylene (19.0 grams, 0.48 mole) was then condensed in the tube. Thereafter, the tube was resealed and placed again in the water bath in close proximity to the ultraviolet lamp.

The total reaction mixture was irradiated for a total of four hours and shaken intermittently by hand. After the first thirty minutes of the irradiation, milky white liquid polymer began to precipitate in the tube. After the reaction period the tube was vented releasing 2.6 grams (0.025 mole) of unreacted methylacetylene. The residual polymer was washed thoroughly with 50 milliliters of methanol and then stripped on a rotary evaporator at 35° C. and 1.0 millimeter of mercury pressure to yield 62.4 grams (79% yield) of a cloudy liquid polymer.

Example 12.—Curing and physical properties of three-component polythioethers

To demonstrate the curability of three-component polythioether products containing pendant masked functionality, samples of the methyl acetylene, trimethylene dithiol, propargyl thiol acetate terpolymer of Example 8 were compounded with fillers and curatives in the proportions shown in Table II below. These formulations were stored overnight at room temperature over saturated aqueous potassium thiocyanate and then heated for 1.5 hours at 286° F. in an air circulating oven to complete curing. Following crosslinking, the vulcanizates were tested to ascertain their resistance to various solvents and also to determine the stress-strain properties of the materials. In each of the tests, the results obtained with the cured three component polythioether products of this invention that contain a plurality of moonsulfide (—C—S—C—)

linkages were compared with those obtained with vulcanizates prepared in the same manner from commercially available Thiokol prepolymers whose molecules are made up of a plurality of polysulfide (e.g.

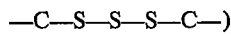

linkages.

In the solvent resistance tests, a 0.1 to 0.2 gram sample of vulcanized polymer was immersed in about 75 milliliters of the solvent employed. The polymer and solvent were then permitted to stand at room temperature without agitation for 48 hours. Thereafter, the polymer sample was removed from the solvent and the solvent adhering to the surface of the sample removed. This sample was then weighed in by the wet condition and then placed in a vacuum oven maintained at temperatures between 40 and 60° C. until the polymer sample was thoroughly dried. The percent swell of the polymer sample was calculated by subtracting the dry weight of the sample from the wet weight of the sample and dividing the value obtained by the dry weight of the sample. Percent insolubles were determined by dividing the dry weight of the polymer by the original weight of the polymer samples introduced to the solvent. Stress-strain properties of the vulcanized formulations were measured on a Scott tensile tester (Micromodel). The results of the test are set forth in Tables III and IV below.

TABLE II.—VULCANIZATE FORMULATIONS

| Sample | Parts by weight | | |
|---|---|---|---|
| | A | B | C |
| Polythioether [1] | 100 | 100 | 100 |
| Thermax Carbon | 30 | 30 | 60 |
| Curing Paste [2] | 60 | 60 | 60 |
| EH 330 [3] | 10 | 10 | 10 |
| Sulfur | | 0.6 | |

[1] Propargyl thiolacetate polythioether of Example 8.
[2] Commercial Thiokol curative, composition (wt. percent): Lead Dioxide, 50; stearic acid, 5; dibutyl phthalate, 45.
[3] Tri (dimethyl amino methyl) phenol.

TABLE III

| | Sample and Test | | | | | | |
|---|---|---|---|---|---|---|---|
| | Percent swell (A) | Percent insolubles (A) | Percent swell (B) | Percent swell (C) | Percent insolubles (C) | Percent swell thiokol polysulfide (LP-2) | Percent swell thiokol polysulfide (LP-32) |
| Solvent: | | | | | | | |
| Benzene | 176 | 81 | 155 | 122 | 91 | 195 | 301 |
| Cyclohexane | 8 | 87 | 9 | 6 | 97 | 5 | 11 |
| CCl₄ | 262 | 81 | 242 | 182 | 96 | 55 | 78 |
| Toluene | 155 | 81 | 136 | 100 | 93 | 95 | 138 |
| Methyl Ethyl Ketone | 35 | 82 | 25 | 29 | 92 | 56 | 87 |
| Water | 37 | 98 | 34 | 23 | 100 | 7 | 2 |

TABLE IV

| | Sample | | | |
|---|---|---|---|---|
| | A | C | Thiokol polysulfide (LP-2) | Thiokol polysulfide (LP-32) |
| 100% modulus, p.s.i | 150 | 295 | 106 | 35 |
| Tensile strength, p.s.i | 214 | 428 | 298 | 190 |
| Elongation, percent | 173 | 193 | 390 | 760 |

The results of the tests indicate that the three component polythioether addition product having pendant masked functionality can be readily crosslinked with simple lead dioxide based curing systems. The data of Table III illustrates that the cured products are highly resistant to degradation upon prolonged contact with various types of solvents. In particular, it should be noted that the cured products of the invention are more resistant to attack from benzene and methyl ethyl ketone (lower percent swell values) than the commercially available Thiokol polysulfide polymers. Additionally, the percent swell values obtained when the cured polythioether products were immersed in cyclohexane and toluene are comparable to the percent swell values exhibited by the Thiokol polysulfide products.

The stress-strain values set forth in Table IV show that the cured polythioether products exhibit considerably higher tensile strengths than the cured Thiokol polysulfide materials. Further advantages of this invention will be apparent to those skilled in the art. Polythioether products containing masked crosslinking functionality that can be readily crosslinked to attractive vulcanizates have been described and can readily and efficiently be prepared with the process of this invention. It is to be understood that this invention is not limited to the specific examples set forth herein, which have been offered merely as illustrations, and that modifications may be made without departing from the spirit and scope of the appended claims.

What is claimed is:

1. A process for the preparation of polythioethers having masked crosslinking sites which comprises reacting a monomer mixture comprising
   (A) a sulfur compound where said compound is
      (1) $H_2S$, (2) a dithiol selected from the group consisting of dithiols having the general formula

H—S—R—S—H wherein R is
         (a) a $C_2$ to $C_{30}$ divalent alkylene radical,
         (b) a $C_8$ to $C_{30}$ bis-alkylene substituted aromatic radical,
         (c) a $C_6$ to $C_{30}$ divalent aromatic radical,
         (d) a $C_2$ to $C_{30}$ divalent organic radical containing an element selected from the group consisting of sulfur, oxygen and silicon;
   (B) a first diunsaturated compound having the general formula selected from the group consisting of
      (1) R'C≡CR' wherein each R' is independently selected from the group consisting of
         (a) hydrogen,
         (b) a $C_1$ to $C_{30}$ alkyl, and
         (c) a $C_7$ to $C_{20}$ aralkyl; and
      (2)

wherein R'' is hydrogen or methyl, (3) $CH_2{=}C{=}CR_2'''$ wherein each R''' is independently selected from the group consisting of
         (a) hydrogen,
         (b) $C_1$ to $C_{20}$ alkyl, and
         (c) $C_7$ to $C_{20}$ aralkyl;
   (C) a second diunsaturate compound selected from the group consisting of
      (a) acetylenic thiol esters having the general formula:

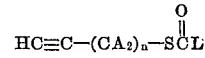

wherein A is hydrogen or $C_1$ to $C_3$ alkyl, L is hydrogen, $C_1$ to $C_6$ alkyl or $C_6$ to $C_{12}$ aryl, and $n$ varies from 0 to 10;
      (b) an allenic thiol ester having the general formula:

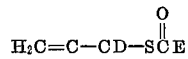

wherein D is selected from the group consisting of a hydrogen atom and an alkyl radical having from 1 to 3 carbon atoms and E is selected from the group consisting of hydrogen, $C_1$ to $C_6$ alkyl and $C_6$ to $C_{12}$ aryl, (c) an S-acetylenic xanthate having the general formula:

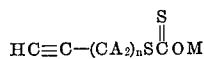

wherein A is selected from the group consisting of hydrogen and $C_1$ to $C_3$ alkyl, M is $C_1$ to $C_6$ alkyl, and $n$ varies from 0 to 10, (d) a 2-tetrahydropyranyl) acetylenyl sulfide having the formula:

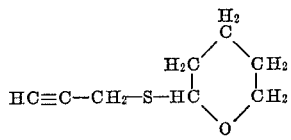

and (e) an acetylenyl isothiouronium hydrohalide having the general formula:

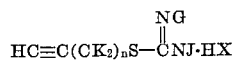

wherein K is selected from the group consisting of hydrogen and $C_1$ to $C_3$ alkyl, G and J are independently selected from the group consisting of hydrogen and $C_1$ to $C_5$ alkyl, X is selected from the group consisting of chlorine and bromine, and $n$ varies from 0 to 10;

and the mole ratio of sulfur compound to the total of said first and second diunsaturate is about 1.2:1 to about 0.9:1; said reaction being carried out at a temperature of about −80 to about 100° C. in the presence of a free radical initiator for a time sufficient to obtain a polythioether product.

2. The process of claim 1 wherein said free radical initiator is heat, radiation or chemical initiators.

3. The process of claim 1 wherein the sulfur compound is a dithiol having the general formula:

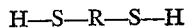

wherein R is $C_2$ to $C_4$ alkylene; the first diunsaturate is a compound having the general formula:

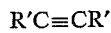

wherein each R' is independently selected from the group consisting of hydrogen, $C_1$ to $C_{30}$ alkyl, $C_7$ to $C_{20}$ aralkyl and mixtures thereof; and the second diunsaturate is an acetylenic thiol ester having the general formula:

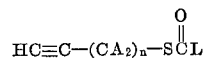

wherein A is hydrogen or $C_1$ to $C_3$ alkyl, L is hydrogen, $C_1$ to $C_6$ alkyl or $C_6$ to $C_{12}$ aryl, and $n$ varies from 0 to 10.

4. The process of claim 3 wherein said dithiol is trimethylene dithiol, the first diunsaturate said acetylenic compound is methylacetylene and said thiol monomer the second diunsaturate is propargyl thiol acetate.

5. The product of claim 1.

6. The product of claim 5 wherein the dithiol has the general formula:

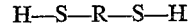

wherein R is $C_2$ to $C_4$ alkylene, the first diunsaturate is an acetylene compound having the general formula:

wherein each R' is independently selected from the group consisting of H, $C_1$ to $C_{30}$ alkyl, $C_7$ to $C_{20}$ aralkyl and mixtures thereof; and the second diunsaturate is an acetylenic compound having the general formula:

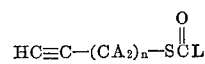

wherein A is hydrogen or $C_1$ to $C_3$ alkyl, L is hydrogen, $C_1$ to $C_6$ alkyl or $C_6$ to $C_{12}$ aryl and $n$ varies from 0 to 10.

7. The addition product of claim 5 crosslinked to a solvent-resistant vulcanizate, the vulcanization being carried out in the absence of solvent using as a vulcanizing agent a base and the oxide of a metal wherein said metal is selected from the group consisting of II–B, IV–B, IV–A and VII–B of the Periodic Table of the Elements.

References Cited

UNITED STATES PATENTS

| | | | |
|---|---|---|---|
| 2,759,913 | 8/1956 | Hulse | 260—79 |
| 3,179,638 | 4/1965 | Shashoua | 260—79.7 |
| 3,306,884 | 2/1967 | Dykstra et al. | 260—79.7 |
| 3,397,189 | 8/1968 | Erickson | 260—79 |

JAMES A. SEIDLECK, Primary Examiner

U.S. Cl. X.R.

260—41, 79.5, 345.1, 455, 609